United States Patent
Harvey

[15] 3,705,749
[45] Dec. 12, 1972

[54] SUSPENSION SYSTEM FOR SNOWMOBILES

[72] Inventor: Charles V. Harvey, Route 3, Box 233, Forest Lake, Minn. 55025

[22] Filed: April 6, 1971

[21] Appl. No.: 131,673

[52] U.S. Cl. .......................305/27, 180/5, 180/9.58
[51] Int. Cl. ........................B62d 55/10, B62m 27/02
[58] Field of Search........180/5 R, 9.24, 9.58; 305/27, 305/24, 28

[56] References Cited

UNITED STATES PATENTS

| | | | |
|---|---|---|---|
| 1,542,149 | 6/1925 | Landry | 305/27 |
| 3,285,676 | 11/1966 | Hetteen | 305/27 |
| 3,404,745 | 10/1968 | Smieja | 180/5 R |
| 3,483,936 | 12/1969 | Nilsson | 180/5 R |
| 3,613,810 | 10/1971 | Hetteen | 180/5 R |

*Primary Examiner*—Richard J. Johnson
*Attorney*—Orrin M. Haugen

[57] ABSTRACT

A track suspension means for vehicles having endless track drive and support surfaces, the vehicle having frame means with forward and rear mounting points. The track suspension means which is coupled to the vehicle at the mounting points includes longitudinally flexible leaf spring means, the leaf spring means having an axis disposed generally parallel to the track axis, and being adapted to flex vertically. The leaf spring, which carries a plurality of supporting means for the track, is secured at its forward end to the vehicle frame at the forward mounting point. The endless track suspension means includes forwardly and rearwardly disposed sprockets inscribed within the endless track, and mounting means are provided for the sprockets including mounting shafts. Track propelling means are coupled to the forwardly disposed sprockets, and track tensioning means and the rear of said leaf spring are operatively coupled to the rearwardly disposed sprockets. Pivot linkage means are provided for coupling the rear sprocket mounting means to the vehicle at the rear mounting point. The pivot linkage means includes a first arm pivotally coupled to the vehicle mounting point and with a floating pivot shaft journaled to the other end of the first arm. A second arm is provided having one end journaled to the floating pivot, and with the other end coupled to the rear sprocket mounting means. Resilient spring bias means are coupled to the second arm and normally urge the mounting shaft means for the rearwardly disposed sprockets in a direction toward the lower span of the endless track.

9 Claims, 5 Drawing Figures

PATENTED DEC 12 1972
3,705,749
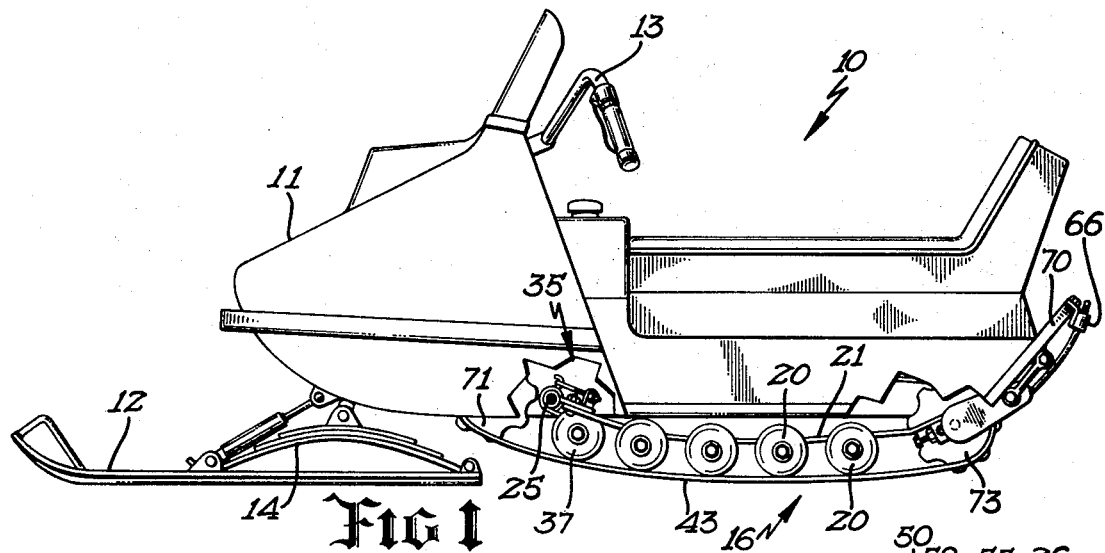
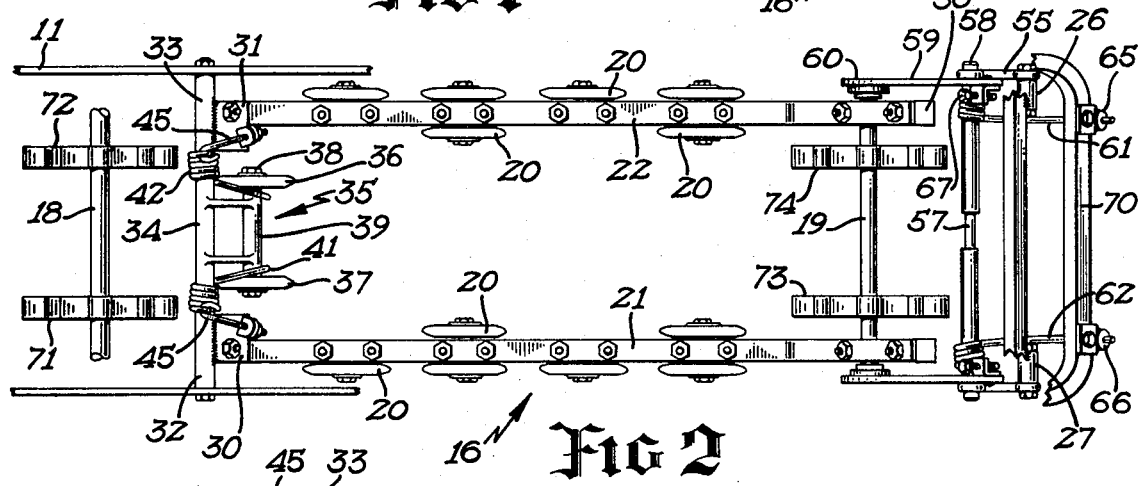
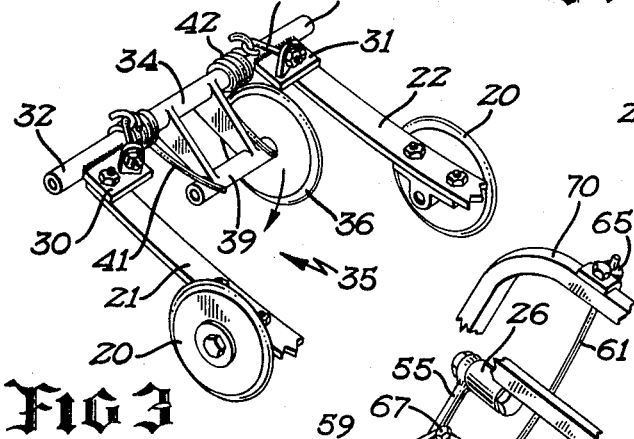
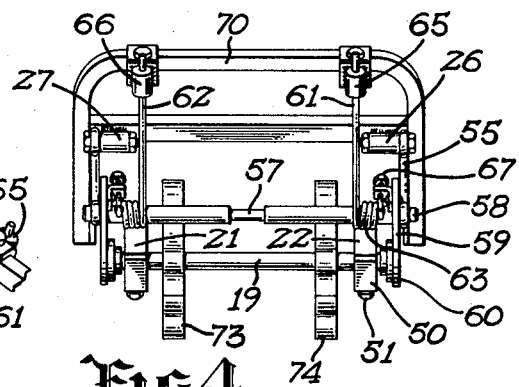
INVENTOR.
Charles Harvey
BY
Orrin M. Haugen

SUSPENSION SYSTEM FOR SNOWMOBILES

BACKGROUND OF THE INVENTION

The present invention relates generally to a track suspension means for vehicles utilizing endless track drive and support surfaces, and more specifically to track suspension means for self-propelled snowmobile structures. The track suspension means is capable of being adjusted to accommodate a given load, and accordingly to provide a smooth ride under all operating conditions. In addition, the track support means provides for optimum contact between the drive surface and the running surface of the ground, inasmuch as the track surface is normally urged into contact with the running surface by resilient flexible leaf spring means.

The track suspension means of the present invention enables the structure to move smoothly over extremely rough terrain, and provides for optimum contact between the track and the running surface of the ground. These advantages are accomplished in the environment of an extremely rugged, durable, and easily serviced structure, the structure being readily adjustable to accommodate the extent of the load to the running conditions.

SUMMARY OF THE INVENTION

Therefore, it is a primary object of the present invention to provide an improved track suspension means for vehicles having endless track drive and support surfaces, such as self-propelled snowmobile, wherein the suspension is extremely rugged and durable, and capable of complying with the surface of extremely rugged and rough terrain.

It is yet a further object of the present invention to provide an improved track suspension means for snowmobile vehicles utilizing an endless track drive and support surface, wherein the suspension means is readily adjustable to accommodate the normal variations in load.

It is yet a further object of the present invention to provide an improved track suspension means for a snowmobile vehicle which is adjustable to load conditions, and which provides a base for the track which readily complies with the surface of the running terrain.

Other and further objects of the present invention will become apparent to those skilled in the art upon a study of the following specification, appended claims, and accompanying drawing.

BRIEF DESCRIPTION OF THE DRAWING

FIG. 1 is a side elevational view, partially broken away, of a snowmobile vehicle having the track suspension means of the present invention mounted thereon, with portions of the vehicle structure being broken away to illustrate details of the track suspension;

FIG. 2 is a top plan view, on a slightly enlarged scale, of the track suspension means, this view being taken with the endless track removed from the structure;

FIG. 3 is a detail perspective view of the front mounting portion for the track suspension means, and illustrating the forward portion only of the leaf spring, with the remaining portions of the leaf spring being broken away;

FIG. 4 is a detail rear elevational view of the rear portion of the track suspension means, and showing this portion with the leaf springs removed; and FIG. 5 is a detail perspective view of the rear quarter quadrant or segment of the track suspension means, and illustrating the details of the mounting of this portion of the suspension means to the vehicle, with portions of the structure being broken away for purposes of clarity.

DESCRIPTION OF THE PREFERRED EMBODIMENT

With particular attention being directed to FIG. 1 of the drawing, the snowmobile vehicle generally designated 10 includes a frame structure and housing 11 supported upon a forward ski structure 12 which is steerable through the steering column 13, and coupled to the frame 11 through the mounting arrangement 14. This part of the structure is conventional and snowmobile vehicles having this arrangement of components are, of course, commercially available. The track suspension means, shown generally at 16, is secured to the frame 11 through detailed mounting features which will be described more fully hereinafter. The track suspension means 16 includes forwardly and rearwardly disposed sprocket assemblies 18 and 19, along with a plurality of boggie wheels such as the boggie wheels 20—20, each of the wheels being mounted on the leaf spring means 21 and 22. In order to couple the track suspension means 16 to the vehicle 11, longitudinally spaced forward and rear mounting points are provided, with the forward mounting point being along mounting shaft 25, and the rear mounting point being along stub shafts 26 and 27, as best illustrated in FIGS. 2, 4 and 5.

As is apparent in the illustration, particularly FIGS. 2 and 3, the leaf spring means 21 and 22 are longitudinally flexible, and have their axes disposed generally parallel to the axis of the track. These leaf springs are adapted to flex vertically about the spring axis so as to accommodate and comply with the nature of the surface of the running terrain. As is illustrated in FIG. 1, the leaf springs 21 and 22 are arranged to be generally convex to the lower span of the endless track, thus providing and accommodating a smooth ride.

With continued attention being directed to the leaf spring means, it will be observed that these springs are coupled, at their forward ends, to a mounting bracket which is secured, through sleeve means, to shaft 25. With particular attention being directed to FIG. 3 of the drawing, it will be observed that the springs 21 and 22 are coupled to mounting ears or brackets 30 and 31 by conventional means, such as bolts or the like, these mounting brackets being, in turn, secured to the sleeves 32 and 33. A third sleeve 34 is disposed intermediate the inner ends of sleeves 32 and 33 for the purpose of accommodating a bias wheel arrangement shown generally at 35. As is apparent, this bias means 35 incorporates a pair of pressure exerting wheels 36 and 37, which are journaled on shaft 38, with shaft 38 being confined within sleeve housing 39, which in turn is coupled by brackets onto sleeve 34. A pair of helically wound spring members 41 and 42 are utilized to resiliently urge the wheels 36 and 37 downwardly against the lower span of the endless track, such as the lower span shown at 43 in FIG. 1. As is apparent from the drawing, the tension in springs 41 and 42 is adjustable by positioning of the J-hooks, such as the J-hook 45.

The individual boggie wheels 20—20 are secured by any suitable means to the extent of the leaf springs 21 and 22. These boggie wheels are conventional in nature, and are adapted to run against the inner surface of the lower span of the endless track, such as the lower span 43. Because of the inherent flexibility of the leaf springs 21 and 22, and their ability to flex vertically about the axis, a smooth ride is possible with the track complying to the surface of the running terrain.

The leaf spring means 21 and 22 are coupled at their rear ends to the support means for the rearwardly disposed sprockets 19. The details of this coupling are best shown in FIGS. 2 and 5. It will be observed that the springs 21 and 22 are, in fact, coupled to the mounting means for the rearwardly disposed sprocket assembly 19, such as on the block 50 which provides a mounting support for adjustably shifting the mounting shaft of the rearwardly disposed sprocket assembly 19. The axial disposition of the shaft supporting the rearwardly disposed sprocket 19 is controlled by the position of the threaded bolt member 51, as is illustrated in FIG. 5.

Attention is now directed to FIGS. 2, 4 and 5 for a discussion of the details of mounting of the rear portion of the track suspension means to the vehicle. In this connection, the frame mounting points are shown at 26 and 27, by the mounting shafts so illustrated. Sleeves are provided for receiving the shafts 26 and 27, and thus provide for pivotal support. The rear mounting arrangement is accomplished through pivot linkage means, with these pivot linkage means including a first arm 55 which is pivotally coupled at one end to the rear frame mounting point, for example, as is illustrated in FIG. 5. The end of the arm 55 is, as indicated, pivotally secured to shaft 26. The other end of arm 55 is pivotally secured to floating pivot shaft 57, such as is illustrated at 58 in FIG. 2. Shaft 57, is of course, journaled for pivotal rotation within arm 55. A second arm 59 is provided in the pivot linkage means, this second arm having one end journaled for pivotal rotation to the floating pivot shaft 57, and with the other end being coupled to the mounting shaft for the rearwardly disposed sprocket assembly 19, as best shown at 60 in FIGS. 2 and 5.

In order to controllably bias the system so that the mounting shaft means for the rearwardly disposed sprockets 19 will be urged toward the lower span of the endless track, a pair of spring members 61 and 62 are provided, these springs being helically wound about floating pivot shaft 57, as shown at 63, and otherwise coupled to the frame of the structure through a pair of spring keepers 65 and 66, The details of this portion of the assembly are believed best illustrated in FIG. 4. Adjustment bolts are provided for springs 61 and 62, such as the adjustment bolt member 67. As is apparent in the structure, the spring keepers 65 and 66 are secured by means of a bolt, or the like, to the rear bar member 70, this providing a convenient means of attachment to the frame of the vehicle.

In actual operation, the user will initially adjust the assembly to receive the endless track, by appropriately setting bolt 51 within the confines of slotted member 50. Once having achieved proper adjustment here, the tension in the track may be controlled by appropriate tightening or relaxation of tension in springs 41 and 42, by adjustment of the J-bolts such as the J-bolt 45. Further adjustment of the track system may be made at the rear portion of the assembly, such as in the adjustment member 67. At this stage, the unit is ready for operation with the rigidity of the system, and the track tension, being appropriately controlled. For heavier loads and duty, a tightening of the individual spring elements will normally be required to avoid "bottoming" of the structure within the confines of the assembly. As is illustrated and apparent in the drawing, the entire track suspension system is confined within the conventional tunnel for the unit.

Also, as is conventional, energy is delivered from the engine of the vehicle to the forwardly disposed sprockets, including sprockets 71 and 72, from sprocket assembly 18, and thus the endless track is caused to move about these elements. The rear sprockets 73 and 74 are, of course, idlers, with these sprockets being provided in the arrangement 19. The individual sprockets 71, 72, 73 and 74 therefore define the elliptical configuration for the endless track, with the configuration and compliance of the lower span 43 being controlled by the disposition of the boggie wheels 20—20 along the leaf springs 21 and 22.

It will be appreciated that the system of the present invention is both rugged and durable, and adjustable to the requirements of the load and the terrain. These adjustments are accomplished readily and easily.

I claim:

1. Track suspension means for vehicles having endless track drive and support surfaces, and comprising:
   a. frame means for said vehicle, and track suspension means coupled thereto at longitudinally spaced forward and rear mounting points, with the endless track having a longitudinal axis;
   b. said track suspension means including longitudinally flexible leaf spring means having an axis disposed generally parallel to the axis of the endless track and adapted to flex vertically about said spring axis, said leaf spring means being coupled at its forward end to said frame at said forward mounting point;
   c. a plurality of track running support means secured to said leaf spring means at spaced points along the longitudinal axis thereof;
   d. said track suspension means including forwardly and rearwardly disposed sprockets inscribed within said endless track to form upper and lower track spans, sprocket mounting means including mounting shaft means for said sprockets, track propelling means and track tensioning means coupled to said forwardly and rearwardly disposed sprockets, said leaf spring means being generally convex to the lower span of said endless track and being coupled at its rearward end to the mounting means for said rearwardly disposed sprocket;
   e. pivot linkage means coupling said rear sprocket mounting means to said rear frame mounting point, said pivot linkage means including a first arm pivotally coupled at one end to said rear frame mounting point and with a floating pivot shaft journaled to the other end thereof, a second arm having one end journaled to said floating pivot shaft and with the other end thereof coupled to the mounting shaft means for said rearwardly disposed sprockets; and f. resilient spring bias means coupled to said second arm and normally urging said mounting shaft means for said rearwardly disposed sprockets toward the lower span of said endless track.

2. The track suspension means as defined in claim 1 being particularly characterized in that means are provided in association with said track tensioning means for adjustably shifting the mounting shaft means for said rearwardly disposed sprocket relative to and along the axis of said endless track.

3. The track suspension means as defined in claim 1 being particularly characterized in that resilient spring bias means are provided for normally urging said floating pivot shaft toward the lower span of said endless track.

4. The track suspension means as defined in claim 1 being particularly characterized in that track tensioning means includes idler wheels disposed adjacent said forwardly disposed sprockets, with said wheels being normally urged toward and against said lower track span.

5. The track suspension means as defined in claim 1 being particularly characterized in that said resilient spring bias means coupled to said second arm is adjustable.

6. The track suspension means as defined in claim 1 being particularly characterized in that said first arm of said pivot linkage means extends downwardly from said rear frame mounting point.

7. The track suspension means as defined in claim 1 being particularly characterized in that said track running support means are boggie wheels.

8. The track suspension means as defined in claim 1 being particularly characterized in that said track propelling means are coupled to said forwardly disposed sprockets.

9. The track suspension means as defined in claim 1 being particularly characterized in that slot means are formed in the rear shaft mounting means for adjustably positioning the mounting shaft means for said rearwardly disposed sprockets.

* * * * *